UNITED STATES PATENT OFFICE.

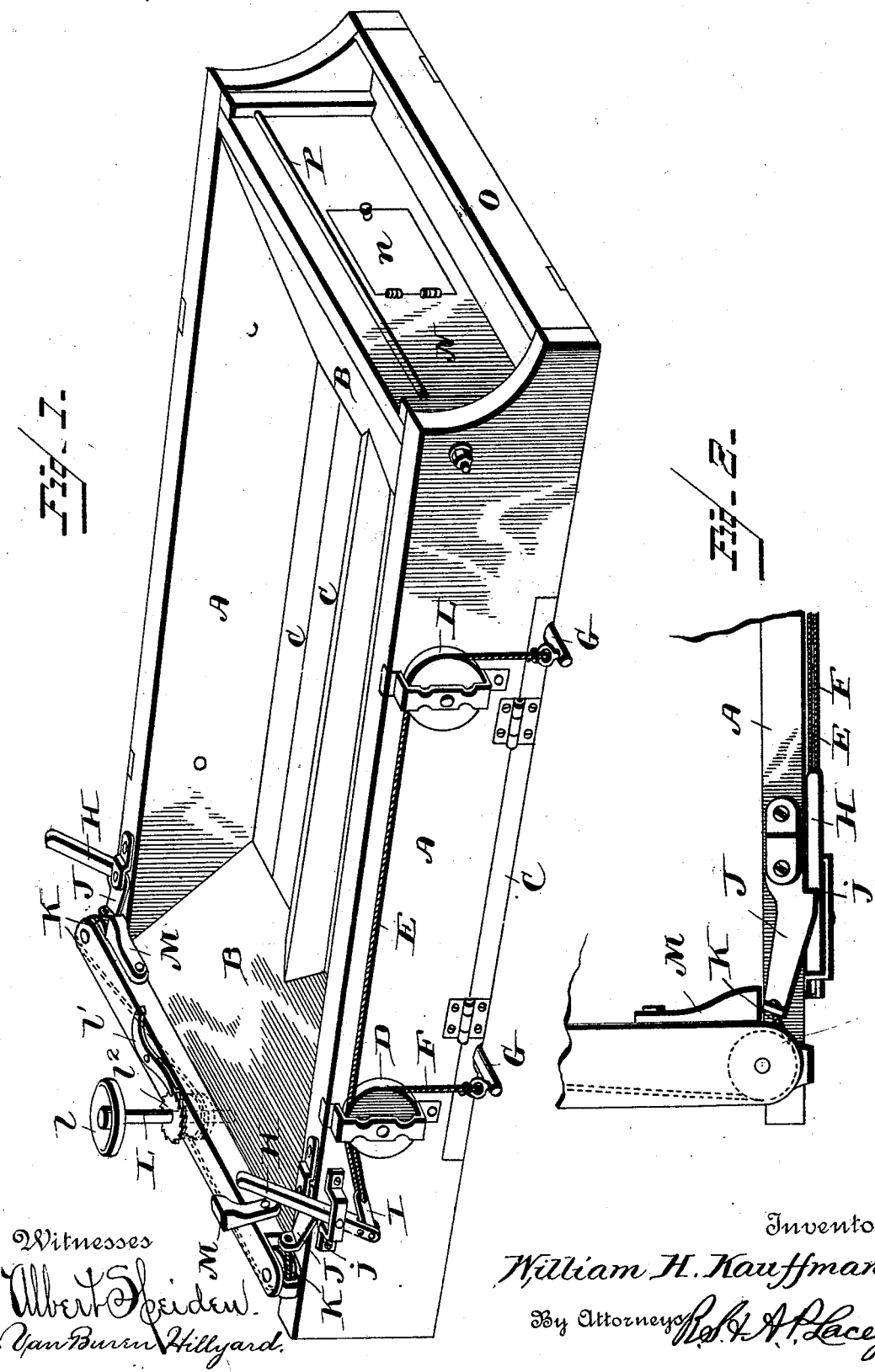

WILLIAM H. KAUFFMAN, OF COLUMBUS, OHIO.

DUMPING-BED FOR WAGONS.

SPECIFICATION forming part of Letters Patent No. 511,528, dated December 26, 1893.

Application filed April 19, 1893. Serial No. 471,028. (No model.)

*To all whom it may concern:*

Be it known that I, WILLIAM H. KAUFFMAN, a citizen of the United States, residing at Columbus, in the county of Franklin, State of Ohio, have invented certain new and useful Improvements in Dumping-Beds for Wagons; and I do hereby declare the following to be a full, clear, and exact description of the invention, such as will enable others skilled in the art to which it appertains to make and use the same.

This invention relates to dumping wagons and is especially designed as an improvement on the dumping bed forming the basis of Patent No. 492,686, granted me February 28, 1893.

The object of the present invention is to facilitate the dumping and admit of the load being dumped from one or both sides of the wagon at the same time and to utilize the space at the rear end of the same for the storage of tools or other articles.

The improvement consists of the novel features and the peculiar construction and combination of the parts which will be hereinafter more fully described and claimed and which are shown in the annexed drawings, in which—

Figure 1 is a perspective view of a wagon bed embodying my invention, parts being broken away to show the tool box provided at the rear end. Fig. 2 is a detail view of the lever for elevating one end of the cross bars, the detent for holding the lever in operative position and the stop for engaging with the detent to hold the same in engagement with the said lever.

The wagon body comprising the side A, sloping ends B and hinged slats or wings C, is of substantially the same construction as shown in my Patent No. 492,686 herein referred to. Pulleys D D are provided on each side near the ends of the wagon body to receive the cords or chains E and F, which are connected at one end to the ends of cross bars G and at their other ends with levers H, preferably by means of short bars I, which latter are adjustably connected with the lower ends of the levers H. These levers H are pivoted between their ends to the sides A and are held in an operative position when the slats or wings C are closed by means of detents J. These detents are pivoted at one end to the top edges of the sides A and have a stop or shoulder $j$ which are adapted to engage with the levers H to retain them in position against the weight of the load and the wings or slats. Cords or chains K connect the forward or free ends of the detents J with a vertical shaft L with which they are connected so that on turning the said shaft L the cords or chains K will be wound thereon and hold the detents J against the strain on the levers H. The shaft L is turned by any suitable means as the hand wheel $l$ and is prevented from turning back by the pawl $l'$ which engages with a ratchet wheel $l^2$ on the said shaft. A stop M is pivoted at one end and is adapted to have its free end engage with the detent J to hold the same against the strain on the lever H in engagement therewith to prevent said lever from moving when it is desired to dump the load from one side of the wagon only. Obviously, if it be desired to dump the load simultaneously from each side the stops M are thrown up out of the way so that when disengaging the pawl from the ratchet wheel $l^2$ the shaft L will turn so as to slacken the cords or chains K and permit the detent J to yield under the strain imposed on the levers H. If it be desired to dump the load on one side, only, the stop M is engaged with the detent J on the side not required to be dumped and when the shaft L is released the detent not held in position by the stop M will yield and permit the load to dump on one side. The sole purpose of the shaft L and the cords or chains K is to hold the detents J in operative position against the strain on the levers H and permit the latter to become disengaged from the detents when the said shaft L is released.

The bottom of the wagon body is projected a short distance beyond the rear end and the sides A are correspondingly extended and sloped downward upon the upper edges, the space between the bottom and the inclined end being closed in on the rear side by a cross piece N which is held in place between cleats and is provided with a door $n$ through which access is had to the inclosed spaces, which space forms a receptacle for tools or other articles. The end gate O is hinged to the prolongation of the bottom and is adapted to swing downward. A tie bar P connects the sides A immediately in the rear of the cross piece and can be tightened or loosened as required to secure or release the cross piece N so that the latter can be removed if desired.

The cross bars G, one near each end of the wagon body, support the wings or slats C in a closed relation when the levers H are drawn back and engaged by the detents J, said detents being held in engagement with the said levers by the means hereinbefore specified.

To dump the entire load the stops M are thrown up and the shaft L released when the strain on the levers H will cause the detents J to yield and permit the wings or slats to drop. However, if it be required to dump only a portion of the load from one side the stop M located on the side not required to be dumped is engaged with the detent J corresponding therewith so that when the shaft L is released the detents engaged by the stop M will not yield. Hence one end of the cross bars will not drop and will support the load at the side of the wagon body not required to be dumped.

Having thus described my invention, what I claim, and desire to secure by Letters Patent, is—

1. In a wagon having movable slats or wings forming the bottom, and a bar to support said slats or wings, of a lever having connection with the said bar, a detent to engage with the said lever and hold it against the strain of the load thereon, and a cord having one end attached to said detent and adapted to have its other end wound upon a shaft to hold said detent in engagement with the lever, substantially as described for the purpose specified.

2. In a dumping wagon having movable slats or wings forming part of the latter, and a bar to support said slats or wings against the load, of a lever having connection with the said bar, a detent to engage with the lever, a cord having connection with the detent and adapted to be wound upon a shaft, and a stop adapted to be engaged with the said detent to hold the same in positive engagement with the lever, substantially as set forth, for the purpose described.

3. In a dumping wagon having movable slats or wings constituting the bottom, the combination of cross bars to support the wings or slats, levers, one on each side of the wagon body, having connection with the said cross bars, detents adapted to engage with the levers, a shaft, cords adapted to wind on the said shaft and having connection with the detents to hold the latter in engagement with the levers and simultaneously release the detent, and stops adapted to be engaged with the said detents to hold one or the other in engagement with the corresponding lever when the said cords are released, substantially as set forth, for the purpose specified.

4. A wagon body having its rear end inclined, and having the bottom and sides projected in the rear of said inclined end, the vertical cross piece closing the space between the bottom and the inclined end, and having a door, a tie bar for binding the sides against the ends of the cross piece, and an end gate, substantially as described for the purpose specified.

In testimony whereof I affix my signature in presence of two witnesses.

WILLIAM H. KAUFFMAN.

Witnesses:
GEORGE S. RICKARD,
A. F. HAINES.